United States Patent
Bolen

(10) Patent No.: US 9,374,990 B2
(45) Date of Patent: Jun. 28, 2016

(54) METHOD AND APPARATUS FOR LASER MOSQUITO CONTROL

(71) Applicant: Innovation Consultants, LLC, Gun Barrel City, TX (US)

(72) Inventor: Pat M. Bolen, Gun Barrel City, TX (US)

(73) Assignee: INNOVATION CONSULTANTS, LLC, Gun Barrel City, TX (US)

( * ) Notice: Subject to any disclaimer, the term of this patent is extended or adjusted under 35 U.S.C. 154(b) by 108 days.

(21) Appl. No.: 13/964,288

(22) Filed: Aug. 12, 2013

(65) Prior Publication Data

US 2015/0040466 A1    Feb. 12, 2015

(51) Int. Cl.
*A01M 1/02*    (2006.01)
*A01M 1/04*    (2006.01)
*A01M 1/22*    (2006.01)

(52) U.S. Cl.
CPC .................. *A01M 1/02* (2013.01); *A01M 1/023* (2013.01); *A01M 1/04* (2013.01); *A01M 1/226* (2013.01)

(58) Field of Classification Search
CPC ........... A01M 1/00; A01M 1/02; A01M 1/04; A01M 1/10; A01M 1/20; A01M 1/22; A01M 1/226
USPC .................. 43/113, 107, 122, 132.1, 144
IPC .................. A01M 1/00, 1/02, 1/04, 1/10, 1/20, A01M 1/22
See application file for complete search history.

(56) References Cited

U.S. PATENT DOCUMENTS

| | | | | |
|---|---|---|---|---|
| 4,856,226 A | * | 8/1989 | Taylor | 43/113 |
| 5,280,684 A | * | 1/1994 | Filonczuk | 43/120 |
| 5,327,675 A | * | 7/1994 | Butler et al. | 43/113 |
| 5,343,652 A | * | 9/1994 | Johnson | 43/132.1 |
| 5,774,088 A | * | 6/1998 | Kreithen | 342/22 |
| 5,857,282 A | * | 1/1999 | Odintsov | 43/1 |
| 5,915,949 A | | 6/1999 | Johnson | |
| 6,269,617 B1 | | 8/2001 | Blanchard | |
| 6,374,584 B1 | | 4/2002 | Blanchard | |
| 7,501,979 B1 | * | 3/2009 | Guice et al. | 342/54 |
| 7,785,541 B1 | * | 8/2010 | Fiorello | 422/124 |
| 7,919,723 B2 | | 4/2011 | Ide et al. | |

(Continued)

FOREIGN PATENT DOCUMENTS

JP    01202233 A  *  8/1989
JP    06197674 A  *  7/1994

(Continued)

*Primary Examiner* — Darren W Ark
*Assistant Examiner* — Magdalena Topolski
(74) *Attorney, Agent, or Firm* — Chainey P. Singleton; Edwin S. Flores; Chalker Flores, LLP

(57) ABSTRACT

The present invention provides an apparatus for damaging a flying pest comprising: a housing connected to a continuous perforated side wall to a laser contacting surface; a laser beam generator and a laser rotating mechanism attached to the housing and positioned to transmit a laser beam generally radially downward toward the laser contacting surface in a 360 degree pattern on the laser contacting surface, wherein the laser beam contacts and damages a flying pest; a control mechanism in communication with the laser beam generator to control the generation of the laser beam and in communication with the laser rotating mechanism to control one or more parameters relating to the pattern; and a power supply in electrical communication with the control mechanism, the laser rotating mechanism, and the laser beam generator.

5 Claims, 1 Drawing Sheet

(56) References Cited

U.S. PATENT DOCUMENTS

2006/0215885 A1* 9/2006 Kates ............................ 382/120
2008/0168702 A1* 7/2008 Jaffrey .......................... 43/111
2012/0096760 A1* 4/2012 Chang ........................... 43/113
2014/0226860 A1* 8/2014 Hyde et al. .................... 382/103
2014/0311014 A1* 10/2014 Feugier ......................... 43/107

FOREIGN PATENT DOCUMENTS

JP 2001275541 A * 9/2001
JP 2003339291 A * 12/2003

* cited by examiner

METHOD AND APPARATUS FOR LASER MOSQUITO CONTROL

CROSS-REFERENCE TO RELATED APPLICATIONS

None.

TECHNICAL FIELD OF THE INVENTION

The present invention relates generally to methods and apparatuses used for pest control and more specifically, to methods and apparatuses that use a laser to injure or destroy mosquitos or other flying pests.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with pest control, including as insects and specifically mosquitos, range from chemical insecticides, electric bug traps, and other devices. These devices often use an attractant like scent, ultraviolet light, or bait, to lure insects into the trap. One specific example is an electric-UV trap which includes an ultraviolet light source that attracts insects surrounded by an electrified grid which electrocutes the insects as they try to reach the ultraviolet light source. Although somewhat effective the trap produces loud sparks and spatters debris making it a less attractive device. Similarly, chemical pesticides are non-selective and can poison non-target species as well as pollute the environment.

U.S. Pat. No. 5,915,949, entitled, "Method and apparatus for laser pest control," discloses a method for controlling pests which uses a laser beam to exterminate pests hidden behind or within a solid barrier. The laser light must have a wavelength and power to sufficiently exterminate the pests hidden behind or within the barrier without damaging the barrier, and can be used to control ant and termite infestation of common household building materials and agricultural pest control of crop fields.

SUMMARY OF THE INVENTION

The present invention provides a laser pest control device for injuring and/or killing one or more flying pests, and in particular, to injure or destroy mosquitos.

The present invention provides an apparatus for damaging a flying pest comprising: a housing; a continuous perforated side wall extending from the housing; a laser contacting surface connected to the continuous perforated side wall and positioned opposite the housing, wherein the laser contacting surface comprises an outer perimeter in communication with the continuous perforated side wall, and extending to an inner perimeter to form a central aperture; a laser beam generator attached to the housing and positioned to transmit a laser beam generally radially downward toward the laser contacting surface; a laser rotating mechanism in communication with the laser beam generator to generate a laser beam and rotate the laser beam in a 360 degree pattern on the laser contacting surface between the outer perimeter and the inner perimeter, wherein the laser beam contacts and damages a flying pest; a control mechanism in communication with the laser beam generator to control the generation of the laser beam and in communication with the laser rotating mechanism to control one or more parameters relating to the 360 degree pattern; and a power supply in electrical communication with the control mechanism, the laser rotating mechanism, and the laser beam generator.

The present invention provides an apparatus for damaging a mosquitos comprising: a housing; a UV light and/or bait in communication with the housing; a continuous perforated side wall extending from the housing; a laser contacting surface connected to the continuous perforated side wall and positioned opposite the housing, wherein the laser contacting surface comprises an outer perimeter in communication with the continuous perforated side wall, and extending to an inner perimeter to form a central aperture; a laser beam generator attached to the housing and positioned to transmit a laser beam generally radially downward toward the laser contacting surface; a laser rotating mechanism in communication with the laser beam generator to generate a laser beam and rotate the laser beam in a 360 degree pattern on the laser contacting surface between the outer perimeter and the inner perimeter, wherein the laser beam contacts and damages a flying pest; a control mechanism in communication with the laser beam generator to control the generation of the laser beam and in communication with the laser rotating mechanism to control one or more parameters relating to the 360 degree pattern; a power supply in electrical communication with the control mechanism, the laser rotating mechanism, and the laser beam generator; and a counting device to count the number of mosquitos killed or damaged by the present invention.

The laser beam generator may have a power in the range of about 1 to 100 watts and produce a wavelength of between 400 and 1100 nm. The laser rotating mechanism may rotate the laser beam at between 1 and 100 Hz in a 360 degree pattern that may be in a clockwise direction, a counter-clockwise direction or both.

The laser beam generator may produce two or more laser beams. For example, the laser beam generator may produce at least a first laser beam and at least a second laser beam and the 360 degree pattern of the least a first laser beam may be in a clockwise direction and the 360 degree pattern of the least a second laser beam may be in a counter-clockwise direction.

The materials of the instant invention may be light absorbing materials and particularly laser light absorbing materials to contain or adsorb errant laser beams. The laser contacting surface, the continuous perforated side wall or both may have of a laser light absorbing material coating for absorbing and containing errant laser beams. The laser contacting surface, the continuous perforated side wall or both may be made from a laser light absorbing material for absorbing and containing errant laser beams.

The present invention also provides a method of damaging a flying pest using a rotating laser system by providing a laser apparatus including at least one laser beam being electrically powered, wherein the laser apparatus comprises a housing, a continuous perforated side wall extending from the housing to a laser contacting surface, a laser beam generator attached to the housing and positioned opposite the laser contacting surface, a laser rotating mechanism in communication with the laser beam generator and an electric power source; generating one or more laser beams with the laser beam generator to transmit the one or more laser beams generally radially downward toward the laser contacting surface; and rotating the one or more laser beams with the laser rotating mechanism in a 360 degree pattern on the laser contacting surface at a rotation speed to form one or more rotating laser beams, wherein upon entering the laser apparatus a flying pest will contact the one or more rotating laser beams and be damaged.

The present invention also provides a method of damaging mosquitos using a rotating laser system by providing a laser apparatus including at least one laser beam being electrically powered, wherein the laser apparatus comprises a housing, a continuous perforated side wall extending from the housing to a laser contacting surface, a laser beam generator attached to the housing and positioned opposite the laser contacting surface, a laser rotating mechanism in communication with the laser beam generator and an electric power source; generating one or more laser beams with the laser beam generator to transmit the one or more laser beams generally radially downward toward the laser contacting surface; and rotating the one or more laser beams with the laser rotating mechanism in a 360 degree pattern on the laser contacting surface at a rotation speed to form one or more rotating laser beams, wherein upon entering the laser apparatus a flying pest will contact the one or more rotating laser beams and be damaged.

The present invention provides a method of reducing transmission of diseases associated with mosquitos using a rotating laser system by providing a laser apparatus including at least one laser beam being electrically powered, wherein the laser apparatus comprises a housing, a continuous perforated side wall extending from the housing to a laser contacting surface, a laser beam generator attached to the housing and positioned opposite the laser contacting surface to generate a laser beam with a wavelength of 350-700 nm, a laser rotating mechanism in communication with the laser beam generator to rotate the laser beam in a 360 degree pattern at between 0.1-100 Hz, and an electric power source; generating one or more laser beams with the laser beam generator to transmit the one or more laser beams generally radially downward toward the laser contacting surface; rotating the one or more laser beams with the laser rotating mechanism in a 360 degree pattern on the laser contacting surface at a rotation speed to form one or more rotating laser beams; contacting a mosquito with the one or more rotating laser beams to damage the mosquito and reduce the mosquito population; and reducing a transmission of one or more diseases associated with mosquitoes. The one or more diseases associated with mosquitoes may be Arboviral Encephalitides, Malaria, Dengue Fever, Dog Heartworm, Rift Valley Fever, West Nile Virus, or Yellow Fever.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
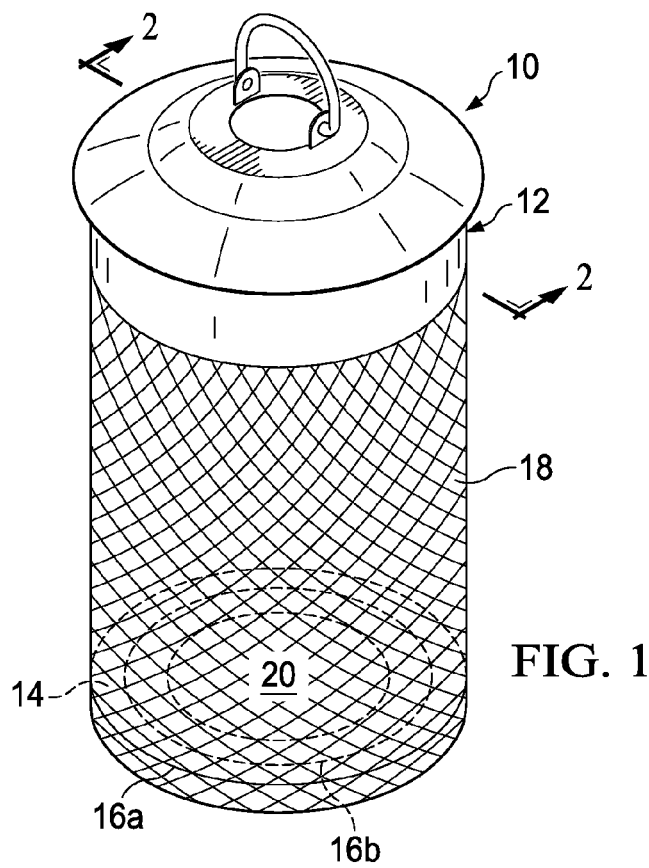
FIG. 1 is an image of one embodiment of the apparatus of the present invention used to injure or destroy mosquitos or other flying pests.

The laser pest control device uses a laser cutting means that is adjustable to project focused laser beams outwards at a plurality of angles to contact flying pests to destroy the pest, damage the pest of both. FIG. 1 illustrates a laser pest control device 10 that includes a housing 12 having a laser contacting surface 14 with an outer perimeter 16a and an inner perimeter 16b being either circular or multi-sided. The laser contacting surface 14 and/or the continuous perforated side wall 18 may be made of or coated with a laser light absorbing material for absorbing and containing errant laser beams. The inner perimeter 16b forms a central aperture 20. The central may be of any diameter necessary for the particular application or may be not present and be a continuous surface. Attached to the outer perimeter 16a is a generally continuous perforated side wall 18 that connects the laser contacting surface 14 to the housing 12. The continuous perforated side wall 18 is extended generally perpendicular around the outer perimeter 16a, and generally upward to the housing 12.

Figure 2:
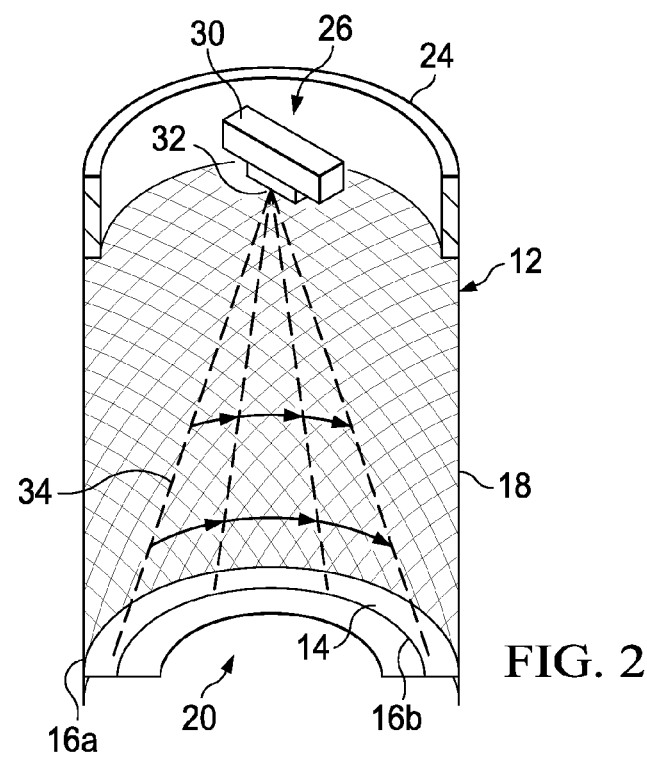
FIG. 2 is a cut away image of the apparatus in FIG. 1 along the a-aa line.

FIG. 2 is an image of the device illustrated in FIG. 1 cut along the a-aa line. The housing 12 includes a second surface 24 opposite the laser contacting surface 14, with an outer perimeter 16a and an inner perimeter 16b being either circular or multi-sided, the second surface 24 and the continuous perforated side wall 18 enclose an interior that opens at the central aperture 20 bounded by the continuous perforated side wall 18. The laser pest control device includes a laser housing 30 connected at a central position 26 and extending downward from the second surface 24 underneath the housing 12. The laser housing 30 includes a laser beam generator 32 oriented a sufficient distance below the second surface 24, and a laser beam rotation mechanism (not shown) to allow the laser beam 34 when generated to rotate in a 360 degree pattern such that the laser beam 34 contacts the laser contacting surface 14 as it rotates. The laser beam generator 32 may generate one or more laser beams 34 as desired by the particular application. The laser beam 34 is transmitted generally radially outwards from the laser beam generator 32 and may include various optical enhancements known to the skilled artisan including but not limited to splitters, lenses, reflectors, detractors, and the like known to those skilled in the art. In addition, the path of the laser beam 34 may be adjusted by an adjustment means (not shown) for angular adjustments of the various paths. The laser beam 34 can be directed in a plurality of angles downward onto the laser contacting surface 14. The laser beam 34 is generated by the laser beam generator 32 in a continuously rotating 360 degree arc that may be either clockwise or counter-clockwise, or a combination of clockwise and counter-clockwise, using a single or multiple laser beams 34. The laser pest control device may include a multiple laser beam configuration that includes at least two opposed laser beams at different angles or two, three, four, five, six, seven, eight, nine or more laser beams at a plurality of angles and in opposed, concurrent paths, or a mixture thereof. For example, one embodiment can have up to about ten opposed laser beams with each beam being opposed to the next and generated at different angles.

The laser pest control device may operate at specific rotation speeds and intensities of the laser beams, but is not limited to a certain constant rotation speed or direction. The speed of rotation of each laser beam 34 is dictated by the laser beam rotation mechanism to control whatever angular direction transmitted from the laser beam generator 32, and can be increased or decreased as necessary depending on the particular embodiment. The limit of the rotational speed for the rotation of each laser beam is only limited by the physical limits of rotation of the laser beam rotation mechanism, as determined by those skilled in the art. The laser beam rotation mechanism is known to the skilled artisan and may be a mechanical device to rotate the laser generator, a mirror that oscillates, an electrical device or other device known to the skilled artisan. Any scattered or reflected laser beams may absorbed by the laser beam absorbing materials such that any errant laser beams are contained within the housing 12 as a safety measure.

The laser pest control device includes a laser housing 30 including a system control mechanism connected to and controlling the laser beam generator 32. The laser housing 30 includes electronic circuitry within, and/or connected to a system control mechanism to control the laser beam rotation mechanism and in turn the angular directions of the laser beam(s), the rotation direction, the rotation speed and other operating parameters of the laser beam generator and the parameters of the laser beam rotation mechanism.

The skilled artisan can adjust the circuitry to control the speed of rotation of the laser beam and/or the intensity of laser beam, and/or the angular direction of the laser beam as necessary. Furthermore, the system control mechanism is capable of controlling a plurality of laser beams generated simultaneously by the laser beam generator and individually control the speed of rotation of each laser beam and/or the intensity of each laser beam, and/or the angular direction of each laser beam.

The system control mechanism, the laser beam rotation mechanism and the laser beam generator are positioned within the housing 12 and electronically connected to a power source. The power source may be of any sufficient power to run the system. For example, the power source maybe a direct connection to a power grid, a rechargeable battery, a plurality of rechargeable batteries, a solar cell, a solar power pack, an electrical generator or a combination thereof. For example, in one embodiment, the power source includes a solar power source connecting a solar cell, and one or more batteries to the system control mechanism, the laser beam rotation mechanism and the laser beam generator. In another embodiment, the power source includes a direct connection to a power grid, a battery backup, a solar cell, and a power control switch to direct the power to/from the direct connection to recharge the battery or to power the device; to use the solar cell to power the device; to use the solar cell to recharge the battery; or other variations thereof known to those skilled in the art.

The system control mechanism may also have an interface that includes a display and or controls to allow the control of the parameters of the system control mechanism, the laser beam rotation mechanism and the laser beam generator. The interface can provide user control of the rotation speed and angular direction, and may optionally provide control of the intensity of the laser beams and/or a visual indication of the rotational speeds of the rotating laser beams. Electrical circuitry is known to those skilled in the art. A number of associated electronic and mechanical components known to those skilled in the art are not illustrated, but can be incorporated without interfering with the objects and advantages of the present invention.

In operation, the laser pest control device may be position in the desired location. Upon applying power to the laser pest control device, the system control mechanism, the laser beam rotation mechanism and the laser beam generator positioned within the housing are electronically engaged. In one embodiment, the interface is used to control the parameters of the system control mechanism, the laser beam rotation mechanism and the laser beam generator and the angular directions of the laser beam(s), the rotation direction, the rotation speed, and other operating parameters are set. In another embodiment these parameters are present into the device and no further modification is allowed or required. The laser beam rotation mechanism and the laser beam generator produce a laser beam that contacts the laser contacting surface at a point and is rotated about the laser contacting surface. The rotating laser beam is only accessible from the central aperture and through the perforations in the continuous perforated side wall. As a pest enters the central aperture, it will at some point contact the rotating laser beam which will at that point either damage the pest, damage at least a portion of the wings of the pest, injure the pest or destroy the pest. Similarly, the pest may enter the perforations in the continuous perforated side wall, and at some point contact the rotating laser beam, which will at that point either damage the pest, damage at least a portion of the wings of the pest, injure the pest or destroy the pest. In addition, the rotation direction, the rotation speed and other operating parameters may be adjusted to optimize the contacting of the pest and the laser beam.

In another embodiment, power may be applied to the laser pest control device to engage the system control mechanism, the laser beam rotation mechanism and the laser beam generator positioned within the housing. The laser beam rotation mechanism and the laser beam generator produce a first laser beam that contacts the laser contacting surface at a first point, and is rotated in a first direction about the laser contacting surface, and the laser beam generator produce a second laser beam that contacts the laser contacting surface at a second point, and is rotated in a second direction about the laser contacting surface. This creates laser beams that are rotating in opposite directions. The rotating laser beams are only accessible from the central aperture and through the perforations in the continuous perforated side wall. As a pest enters the central aperture it will at some point contact at least one of the rotating laser beams which will at that point either damage the pest, damage at least a portion of the wings of the pest, injure the pest or destroy the pest. Similarly, the pest may enter the perforations in the continuous perforated side wall and at some point at least one of the rotating laser beams which will at that point either damage the pest, damage at least a portion of the wings of the pest, injure the pest or destroy the pest.

The laser pest control device may be of any size and scale desired by the skilled artisan. For example, the laser pest control device may be a personal use size ranging from a housing that is less than a foot in diameter and has a continuous perforated side wall of less than a foot in height. The laser pest control device may be a commercial use size ranging from a housing that is more than a foot in diameter and has a continuous perforated side wall of more than a foot in height. The laser pest control device may also be an industrial use size ranging from a housing several feet in diameter and has a continuous perforated side wall of several feet in height. The laser pest control device may be adapted for use in any environment, e.g., warehouses, pool areas, fields, gardens, greenhouses and other environments where pests reside.

The laser beam may be continuous or pulsed. The laser beam generator may be any type of commercially available laser of sufficient power, such as a $CO_2$, Nd-YAG, Nd-glass, helium-neon, ruby, aluminum-gallium-arsenide, dye, helium-cadmium, argon, krypton, or KTP-YAG laser. Wavelengths for these known lasers vary from about 0.4 to 10.6 microns, but wavelengths outside this range, for example, all infrared, visible and ultraviolet light, could also be employed. The laser beam generator may be any type of commercially available laser of sufficient power, such as a 20-274 mW Green laser, 250-849 mW Green laser, 2-349 mW Violet Laser, 400 mW Blue Laser, 50-1299 mW Blue Laser, 0.6-5.0 mW Blue Laser, 0.6-59 mW Yellow Laser, 2-14 mW Yellow Laser, 200-671 nm Red Laser, 500-699 mW Infrared Laser, 1200-1300 mW Infrared Laser, 700-1399 mW Infrared Laser, 2000-2399 mW Infrared Laser. Specific examples include a 447 nm Blue laser, 473 nm Blue laser, 532 nm Green laser, 532 nm Green laser, 589 nm Yellow laser, 593.5 nm Yellow laser, 635 nm Red laser, 640 nm Red laser, 658 nm Red laser, 671 nm Red laser, 808 nm IR laser, 808 nm IR laser, 1064 nm IR laser and 1064 nm IR laser. Depending on the type of pest, the power level of the laser source should be at least about 0.1 watt for insects and other small or microscopic creatures, but may be between 0.1 watt and 1 watt, 1 watt to 2 watts, 2 watts to as high as 1000 watts. In addition, the present invention may be adjustable in the number of watts and power output produced by the invention. In embodiments where there are multiple lasers beams, each beam may have the same or a different wavelength and/or power. One specific example includes a blue violet laser beam (about 405 nm) with a power output of 1 watt, 0.75 watts or 0.5 watts.

One embodiment of the laser beam rotation mechanism includes a commercially available moving mirror imaging unit, such as those of the LK series available from General Scanning, Inc., or a unit driven by an oscillator or function generator such as the Model 3020 Sweep/Function Generator made by Dynascan Corporation, to rotate the laser beam. The laser beam rotation mechanism may also include accessories that focus the beam to a spot to maintain a desired beam diameter throughout the area. A lens or equivalent device, such as a combination of curved mirrors, may be used to cause the beam to diverge (widen) with increasing distance. The rotation speed may be varied depending on the specific pest being targeted, and may range from a rotation speed of 1 Hertz (cycles per second), which is typical, with speeds up to 100 KHz or more.

In addition, instead of relying on the pest to randomly enter the laser pest control device, one or more attractants may be used and take a variety of forms. In general, anything that is effective to lure the target pests into the scanned area can be used, such as an ultraviolet light source which attracts a variety of insects. Other possible attractants include an incandescent or fluorescent light, sound generator, pest hormone, odor generator, an object with a specific color, and bait known to the skilled artisan.

Optional accessories include a beam widening lens, a beam narrowing lens, and a cone-shaped shade for rigidly connecting lens. In addition, optional sensors may be connected to the pest control system for recording, storing and transmitting various data. For example, a camera, a microphone and a counting mechanism may be used to count the number of pests that contact the device at any unit of time. In addition, a storage device may be in communication with the counting mechanism to record various data relative to the number of pests/time, date and time, location, etc. Optionally, a transmitter may be connected to the storage device, counting mechanism, or both to allow data transfer over wired or wireless systems. In addition, the housing may include various sensors and electronic devices including a camera, processors, storage devices, communication devices, timers storage device to store data, e.g., time, date, GPS location, etc. The invention may also include a Wi-Fi, Bluetooth or cellular mechanism to send and receive data, and to allow the remote control of the mechanisms including laser wavelength, laser power, laser rotation, data acquisition, on and off of components, etc. In addition, the housing may include a mechanism to prevent tampering and removal of the device. This may include an alarm to sound and/or flash when tampered with or an alert signal sent to a remote location.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An apparatus for damaging mosquitoes comprising:
   a housing;
   a continuous perforated side wall extending from the housing;
   a laser contacting surface connected to the continuous perforated side wall and positioned opposite the housing, wherein the laser contacting surface comprises an outer perimeter in communication with the continuous perforated side wall, and extending to an inner perimeter to form a central aperture, wherein the laser contacting surface, the continuous perforated side wall, or both comprises a laser light absorbing material to absorb and contain errant laser beams;
   a laser beam generator attached to the housing and positioned to transmit two or more laser beams generally radially downward toward the laser contacting surface;
   one or more beam focusing lens selected from a beam widening lens, a beam narrowing lens, or both;
   a laser rotating mechanism in communication with the laser beam generator to generate two or more laser beams with a wavelength of 350-700 nm and rotate each of the two or more laser beams in a 360 degree pattern at between 0.1-100 Hz on the laser contacting surface between the outer perimeter and the inner perimeter, wherein the two or more laser beams contact and damage a mosquito;
   a control mechanism in communication with the laser beam generator to control the generation of the two or more laser beams and in communication with the laser rotating mechanism to control one or more parameters relating to the 360 degree pattern; and
   a power supply in electrical communication with the control mechanism, the laser rotating mechanism, and the laser beam generator.

2. The apparatus of claim 1, wherein the laser beam generator has a power in the range of about 0.25 to 10 watts.

3. The apparatus of claim 1, wherein the laser contacting surface, the continuous perforated side wall, or both are made of a laser light absorbing material for absorbing and containing errant laser beams.

4. The apparatus of claim 1, further comprising one or more sensors, recording device, storing device, transmitting device, a camera, a microphone, a counting mechanism, one or more processors, communication devices, timer, GPS, alarm, wireless communication, an anti-tampering mechanism or a combination thereof.

5. The apparatus of claim 1, wherein the laser beam generator produces at least a first laser beam and at least a second laser beam and the 360 degree pattern of the at least a first laser beam is in a clockwise direction and the 360 degree pattern of the at least a second laser beam is in a counter-clockwise direction.

* * * * *